(12) United States Patent
Ogawa (10) Patent No.: US 11,402,285 B2
(45) Date of Patent: Aug. 2, 2022

(54) FORCE SENSOR AND DEVICE PROVIDED WITH FORCE SENSOR

(71) Applicant: CANON KABUSHIKI KAISHA, Tokyo (JP)

(72) Inventor: Naoya Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 16/851,607

(22) Filed: Apr. 17, 2020

(65) Prior Publication Data
US 2020/0240865 A1    Jul. 30, 2020

Related U.S. Application Data

(63) Continuation of application No. PCT/JP2018/038907, filed on Oct. 12, 2018.

(30) Foreign Application Priority Data

Oct. 20, 2017 (JP) .............................. JP2017-203692

(51) Int. Cl.
*G01L 5/169* (2020.01)
*G01D 5/26* (2006.01)
*G01L 5/166* (2020.01)

(52) U.S. Cl.
CPC ................ *G01L 5/169* (2020.01); *G01D 5/26* (2013.01); *G01L 5/166* (2013.01)

(58) Field of Classification Search
CPC ......... G01L 1/142; G01L 5/165; G01L 5/169; G01L 5/166; G01D 5/26
(Continued)

(56) References Cited

U.S. PATENT DOCUMENTS

| 5,090,818 A | 2/1992 | Kleinerman | 374/131 |
| 7,401,524 B2 * | 7/2008 | Yoshikawa | G01L 9/125 73/718 |

(Continued)

FOREIGN PATENT DOCUMENTS

| CN | 106895930 | 6/2017 |
| EP | 2927654 | 10/2015 |

(Continued)

OTHER PUBLICATIONS

International Search Report, dated Nov. 27, 2018, in International Application No. PCT/JP2018/038907.
(Continued)

*Primary Examiner* — Octavia Davis Hollington
(74) *Attorney, Agent, or Firm* — Venable LLP (57) ABSTRACT

The invention relates to a force sensor 100 that detects a force acting from the outside, and provides the force sensor 100 whose reduction in size and cost can be achieved. The force sensor 100 includes a support member 20, a force receiving member 4 that is displaced with respect to the support member 20 by the action of an external force, an elastic connection member 5 connecting the support member 20 and the force receiving member 4, scales 8a to 8d, which are detection target object bodies, disposed at the elastic connection member 5, displacement detection elements 9a to 9d that are mounted on the sensor substrate 7 composing the support member 20 so as to face the scales 8a to 8d in a one-to-one manner, and that detect movements of the scales 8a to 8d.

11 Claims, 6 Drawing Sheets

(58) Field of Classification Search
USPC .................................................. 73/862.624
See application file for complete search history.

(56) References Cited

U.S. PATENT DOCUMENTS

| | | | |
|---|---|---|---|
| 8,656,787 B2 * | 2/2014 | Ishihara | ................ G01L 9/0075 |
| | | | 73/724 |
| 9,383,277 B2 * | 7/2016 | Okada | ....................... G01L 1/26 |
| 10,564,059 B2 * | 2/2020 | Okada | .................... G01L 5/166 |
| 11,054,331 B2 * | 7/2021 | Ishihara | ................ G01L 9/0075 |
| 2005/0185196 A1 | 8/2005 | Kitamura et al. | |
| 2007/0284512 A1 | 12/2007 | Tanabe et al. | |
| 2010/0027033 A1 | 2/2010 | Becker et al. | |
| 2016/0252410 A1 * | 9/2016 | Teshigawara | ............ G01D 5/12 |
| | | | 73/862.046 |
| 2020/0238537 A1 * | 7/2020 | Nagura | ................. B25J 13/085 |

FOREIGN PATENT DOCUMENTS

| | | | |
|---|---|---|---|
| JP | H05-312659 A | | 11/1993 |
| JP | H05312659 | * | 11/1993 |
| JP | 2005-241353 A | | 9/2005 |
| JP | 2007-240267 A | | 9/2007 |
| JP | 5602582 B2 | | 10/2014 |
| JP | 2017-62147 A | | 3/2017 |

OTHER PUBLICATIONS

Office Action dated Jul. 23, 2021 in counterpart Chinese Application No. 201880067758.3, together with English translation thereof.
Extended European Search Report dated Aug. 30, 2021 in counterpart EP Application No. 18868168.8.

* cited by examiner

FORCE SENSOR AND DEVICE PROVIDED WITH FORCE SENSOR

CROSS-REFERENCE TO RELATED APPLICATIONS

This application is a Continuation of International Patent Application No. PCT/JP2018/038907, filed Oct. 12, 2018, which claims the benefit of Japanese Patent Application No. 2017-203692, filed Oct. 20, 2017, both of which are hereby incorporated by reference herein in their entirety.

BACKGROUND OF THE INVENTION

Field of the Invention

The present invention relates to a force sensor that detects a force applied from the outside and a device including the force sensor.

Background Art

A force sensor is used as a unit that detects an external force acting on each part of an arm of an industrial robot or a manipulator for medical use and the like. An example of a force sensor includes a 6-axis force sensor using an optical displacement sensor disclosed in PTL 1. The force sensor described in PTL 1 includes a support member, a force receiving member, an elastic connection member that connects them, and a displacement direction conversion mechanism disposed between the support member and the force receiving member. The displacement direction conversion mechanism is provided with a detection target object, and a displacement detection element provided on the support member so as to face the detection target object detects the movement of the detection target object. For example, when an external force acts on the force receiving member in a state where the support member is fixed, the elastic connection member is elastically deformed, and a displacement corresponding to the direction and magnitude of the external force with respect to the support member is generated in the force receiving member. At this time, the displacement direction conversion mechanism also deforms with the deformation of the force receiving member, and the displacement direction of the displacement member of the displacement direction conversion mechanism is displaced in a direction orthogonal to the displacement of the force receiving member.

CITATION LIST

Patent Literature

PTL 1: Japanese Patent No. 5602582

In the above-described force sensor according to the related art, it is necessary to provide a displacement direction conversion mechanism for transforming displacement and a detection target object in the displacement direction conversion mechanism in addition to the support member, the force receiving member and the elastic connection member. Therefore, the number of components increases and the assembling process becomes complicated, so that reduction in size and cost is not easy.

SUMMARY OF THE INVENTION

The present invention provides a force sensor that can be reduced in size and cost, and an apparatus including the sensor.

A force sensor according to the present invention includes a support member, a force receiving member configured to be displaced with respect to the support member by an action of an external force, an elastic connection member connecting the support member and the force receiving member, a plurality of detection target objects disposed on the elastic connection member, and a plurality of displacement detection elements disposed on the support member so as to face the detection target objects in a one-to-one manner, and configured to detect movements of the detection target objects, wherein the elastic connection member has a displacement member that is displaced, by a displacement of the force receiving member in a first direction with respect to the support member, in a direction intersecting the first direction, and the detection target objects are disposed on the displacement member.

Further features of the present invention will become apparent from the following description of exemplary embodiments with reference to the attached drawings.

DESCRIPTION OF THE EMBODIMENTS

Figure 1:
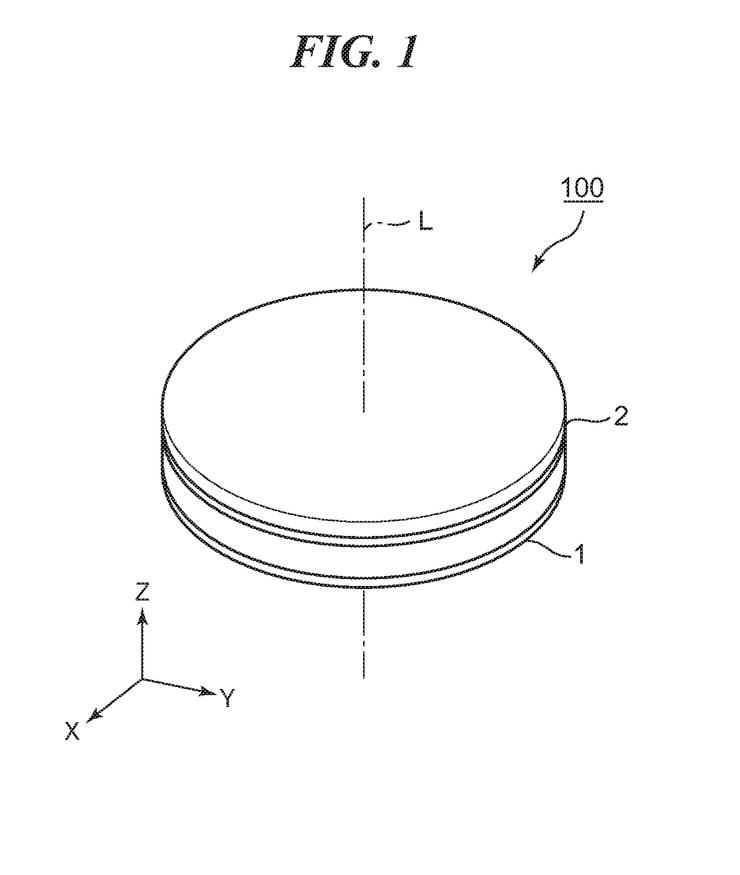
FIG. 1 is an external perspective view of a force sensor according to a first embodiment of the present invention.

Hereinafter, embodiments of the present invention will be described in detail with reference to the accompanying drawings. FIG. 1 is an external perspective view of a force sensor 100 according to the first embodiment of the present invention. The force sensor 100 includes a substantially cylindrical main body 2 and a disk-shaped lower lid 1, and the lower surface of the main body 2 is sealed by the lower lid 1. For convenience of explanation, as shown in FIG. 1, an X axis, a Y axis, and a Z axis are defined, and the direction of the arrow for each axis is defined as a + direction. The Z axis is a direction parallel to the thickness direction of the force sensor 100, and an axis that is parallel to the Z axis and passes through the center of the force sensor 100 (the center of a force receiving member 4 described later) is defined as the central axis L. The X axis and the Y axis are orthogonal to each other and orthogonal to the Z axis.

Figure 2A:
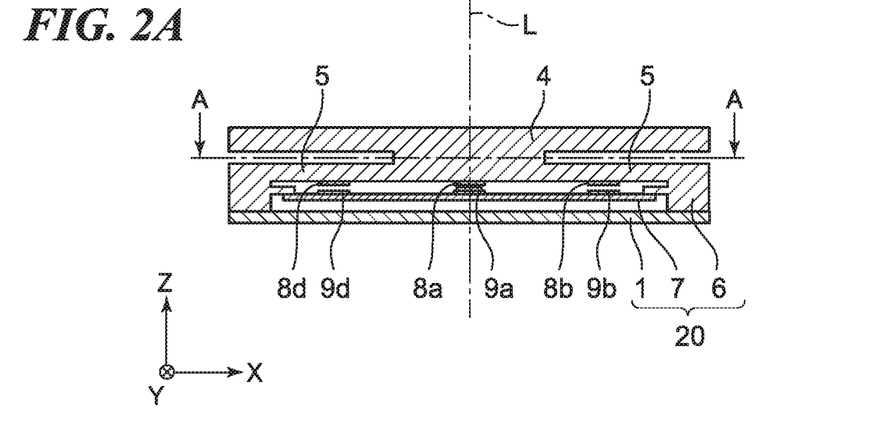
FIG. 2A is a cross-sectional view showing a schematic structure of the force sensor shown in FIG. 1.
Figure 2B:
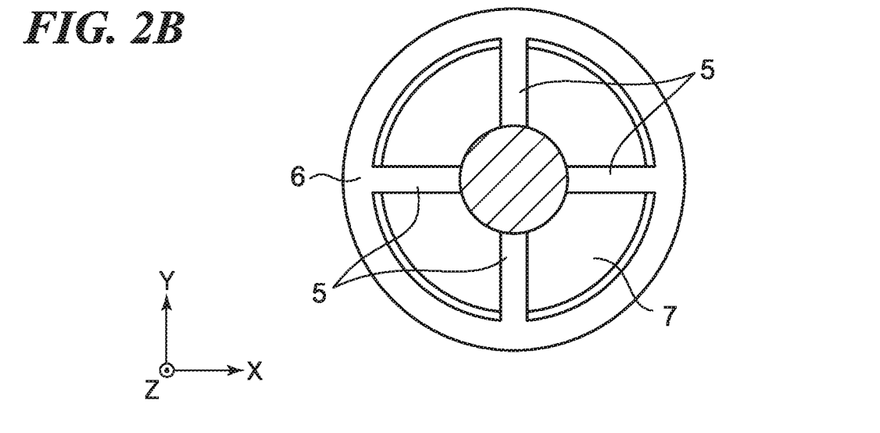
FIG. 2B is a cross-sectional view showing a schematic structure of the force sensor shown in FIG. 1.
Figure 2C:
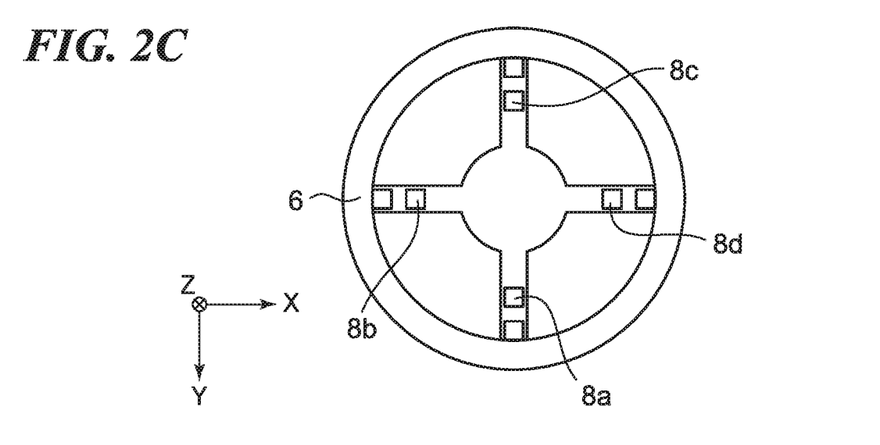
FIG. 2C is a rear view showing a schematic structure of the force sensor shown in FIG. 1.

FIG. 2A is a cross-sectional view of the force sensor 100, on the ZX plane including the central axis L. FIG. 2B is a cross-sectional view taken along line A-A in FIG. 2A. FIG. 2C is a plan view (rear view) of the main body 2 viewed from the −Z direction toward the +Z direction with the lower lid 1 and a sensor substrate 7 being removed from the main body 2. The force sensor 100 is a three-axis force sensor, and can detect Fz (force in the Z direction) and Mx, My (moment about the X axis, moment about the Y axis). Here, each of the X direction, the Y direction, and the Z direction is as shown in each drawing.

The main body 2 includes a cylindrical member 6, an elastic connection member 5 connected to the cylindrical member 6, and the force receiving member 4 connected to the elastic connection member 5. The sensor substrate 7 is fixed inside the cylindrical member 6, and the lower lid 1 is fixed to the lower surface of the cylindrical member 6. A support member 20 is composed of the cylindrical member 6 and the lower lid 1. It should be noted that in the present embodiment, since the sensor substrate 7 is fixed to the cylindrical member 6 and becomes an immovable component with respect to the cylindrical member 6, the sensor substrate 7 is considered to be included in the support member 20.

The support member 20 and the force receiving member 4 are connected by the elastic connection member 5, therefore, the force receiving member 4 is displaceable in the Z direction with respect to the support member 20, and is inclinable around the X axis and the Y axis. The force sensor 100 is used in a manner that the cylindrical member 6 and/or the lower lid 1 of the support member 20 is attached to a base or the like (not shown) and the force receiving member 4 is attached to a robot arm or manipulator (not shown). In the force sensor 100, the force receiving member 4 includes a disk portion, and a cylinder portion protruding from the center of one plane of the disk portion, the other plane of the disk portion is attached to the robot arm or the manipulator, and the cylinder portion is connected to the cylindrical member 6 via the elastic connection member 5.

In the force sensor 100, the four elastic connection members 5 are provided between the support member 20 and the force receiving member 4 so as to be substantially cross-shaped when viewed from the Z direction. In other words, the elastic connection members 5 are disposed radially about the central axis L at four positions at 90-degree intervals in the XY plane. Scales 8a to 8d, which are the detection target objects, are respectively disposed on the four respective elastic connection members 5 so as to have substantially the same height in the Z direction (that is, so as to be located on substantially the same plane). Further, displacement detection elements 9a to 9d are mounted on the sensor substrate 7 so as to face the scales 8a to 8d in a one-to-one manner in the Z direction. The scales 8a to 8d are disposed so as to have substantially the same height in the Z direction, and the mounting surface of the components of the sensor substrate 7 is substantially parallel to the XY plane, so that the distance between the scales 8a to 8d and the corresponding displacement detection elements 9a to 9d, respectively is substantially the same. Each of the displacement detection elements 9a to 9d is a light receiving element such as a photodiode, for example. It should be noted that a configuration in which the elastic connection members are radially disposed at substantially equal intervals around the central axis L according to the number of the elastic connection members may be possible. For example, a configuration in which the three elastic connection members instead of the four elastic connection members are disposed at 120 degrees intervals may be possible.

When the external force Fz acts on the force receiving member 4, the force receiving member 4 is displaced in the Z direction with respect to the support member 20. When the moment Mx acts on the force receiving member 4, the force receiving member 4 is inclined around the X axis, and when the moment My acts on the force receiving member 4, the force receiving member 4 is inclined around the Y axis. When the force receiving member 4 is displaced or inclined, the elastic connection member 5 connected to the force receiving member 4 is inclined, and accordingly, the scales 8a to 8d are inclined.

Figure 3:
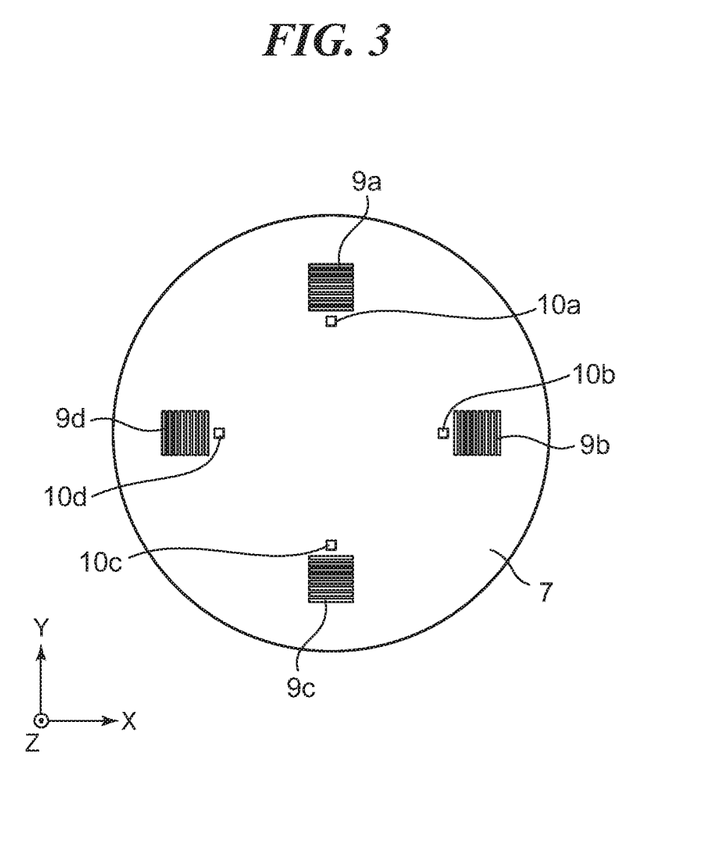
FIG. 3 is a plan view showing the structure of the upper surface of a sensor substrate composing the force sensor of FIG. 1.

A method for detecting the external force and the moment acting on the force receiving member 4 by detecting the inclination generated at the scales 8a to 8d by the displacement detection elements 9a to 9d will be described. FIG. 3 is a plan view showing the configuration of the upper surface of the sensor substrate 7. Light sources 10a to 10d are disposed on the sensor substrate 7 so as to correspond to the displacement detection elements 9a to 9d, respectively. The light sources 10a to 10d may be mounted integrally with the displacement detection elements 9a to 9d, respectively, or may be mounted separately from the displacement detection elements 9a to 9d.

Each of the light sources 10a to 10d is, for example, a light emitting diode (LED). Each of the displacement detection elements 9a to 9d is configured by a plurality of light receiving surfaces arranged as detection surfaces in a stripe shape. Although not shown, each of the scales 8a to 8d is composed of a substrate made of glass or the like and a grating made of a reflection film made of metal or the like formed on the front surface or the rear surface of the substrate. The scales 8a to 8d are disposed so as to face the displacement detection elements 9a to 9d, respectively. When divergent light beams are emitted from the light sources 10a to 10d to the scales 8a to 8d, respectively, the reflected light from the scales 8a to 8d forms a pattern of diffracted light as bright and dark fringes on the displacement detection elements 9a to 9d. Therefore, when the scales 8a to 8d are inclined in the direction of arrangement of the light receiving surfaces of the displacement detection elements 9a to 9d, the patterns of the diffracted light on the displacement detection elements 9a to 9d move accordingly. The amounts of inclination of the scales 8a to 8d can be detected by detecting the movement of this diffracted light pattern, and the external force Fz and the moments Mx, My, which are three components of the external force, can be obtained from the amounts of inclination of the scales 8a to 8d by calculation.

As described above, in the force sensor 100, since the scales 8a to 8d are installed on the elastic connection member 5, it is not necessary to separately provide a displacement conversion mechanism. Also, each of the scales 8a to 8d is disposed facing the same direction (−Z direction), and in order to correspond this arrangement, the displacement detection elements 9a to 9d may be mounted on the sensor substrate 7 so as to face the scales 8a to 8d, so that the assemble is easy. Thus, in the force sensor 100, the size reduction and the cost reduction can be realized.

It should be noted that in the present embodiment, a method for optically detecting the displacements of the scales 8a to 8d (detection target object) is used. However, the method for detecting the displacement of the detection target object is not limited to this, and, for example, a capacitance type detection unit or a magnetostriction type detection unit may be used. When the capacitance type is used, the amount of displacement of the detection target object can be detected by detecting a change in capacitance between the detection target object and the detection element accompanying the displacement of the detection target object with respect to the detection element. When the magnetostriction type method is used, the amount of displacement of the detection target object can be detected by the detection element detecting a change in the magnetic field due to the displacement of the detection target object.

Second Embodiment

Next, a force sensor 100A according to the second embodiment of the present invention will be described. Since the appearance of the force sensor 100A is the same as the appearance of the force sensor 100 described in the first embodiment (see FIG. 1), illustration and description thereof are omitted here. Further, for the components of the force sensor 100A having the same function as the components of the force sensor 100 described in the first embodiment, the same reference numerals are assigned using the same names, and the duplicate description will be omitted.

Figure 4A:
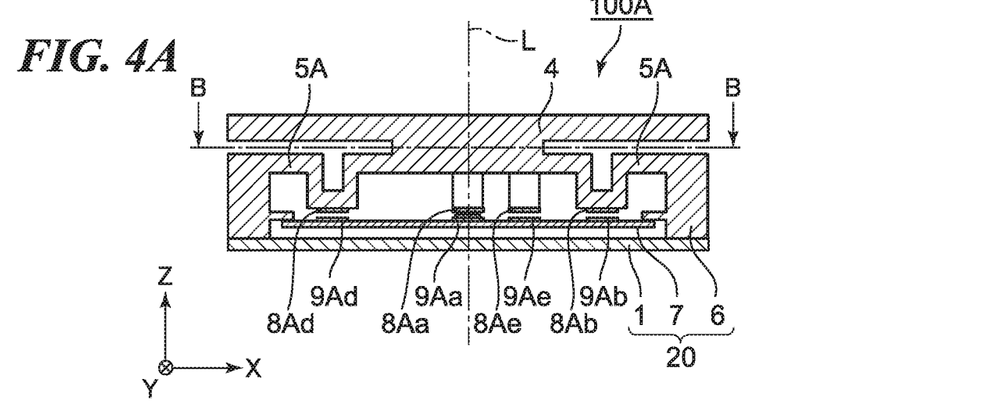
FIG. 4A is a cross-sectional view showing a schematic structure of a force sensor according to a second embodiment of the present invention.
Figure 4B:
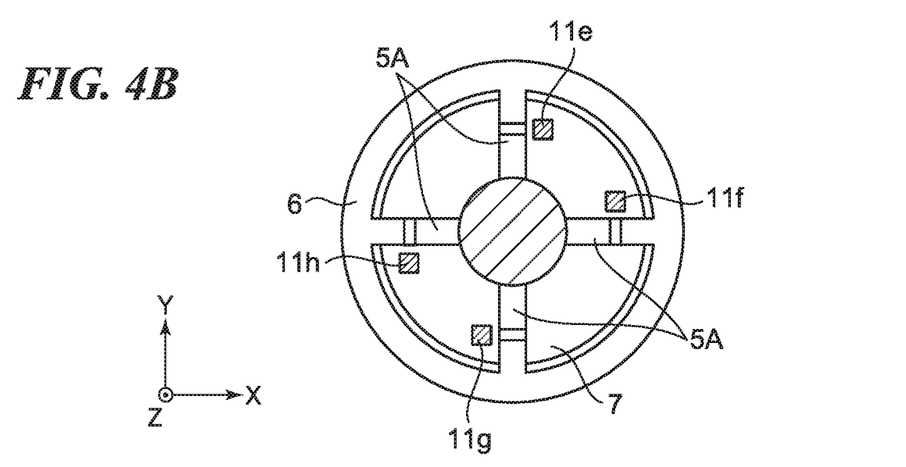
FIG. 4B is a cross-sectional view showing a schematic structure of a force sensor according to a second embodiment of the present invention.
Figure 4C:
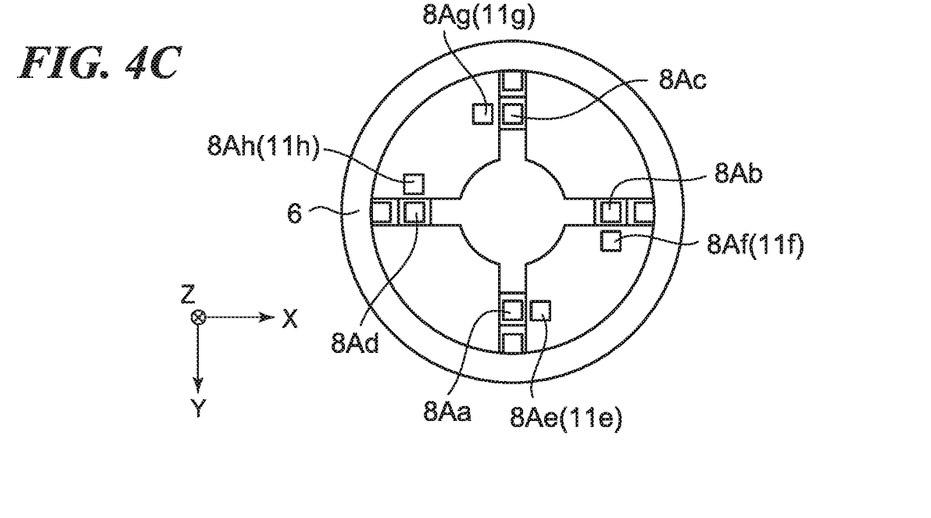
FIG. 4C is a rear view showing a schematic structure of a force sensor according to a second embodiment of the present invention.

FIG. 4A is a cross-sectional view showing a schematic configuration of the force sensor 100A according to the second embodiment of the present invention. FIG. 4A is a cross-sectional view of the force sensor 100A, on the ZX plane including the central axis L, as in FIG. 2A. FIG. 4B is a cross-sectional view taken along line B-B in FIG. 4A. FIG. 4C is a plan view (rear view) of the main body 2 (cylindrical member 6) from the −Z direction toward the +Z direction with the lower lid 1 and the sensor substrate 7 being removed from the main body 2 (cylindrical member 6).

The force sensor 100A is a 6-axis force sensor, and can detect Fx, Fy, Fz (external forces in the X, Y, and Z directions) and Mx, My, Mz (moments around the X, Y, and Z axes). In the force sensor 100A, the force receiving member 4 and the support member 20 are connected by an elastic connection member 5A, the force receiving member 4 can be displaced and inclined with respect to the support member 20 in each of the X direction, the Y direction, and the Z direction.

The arrangement form of the four elastic connection members 5A is the same as the arrangement form of the four elastic connection members 5 in the force sensor 100 according to the first embodiment. Each of the four elastic connection members 5A has a substantially U-shape protruding downward in the Z direction, scales 8Aa to 8Ad, which are detection target objects, are disposed at positions facing the sensor substrate 7 at the outer bottom surface of the substantially U-shape. Also, protrusions 11e to 11h protruding toward the sensor substrate 7 are provided in the areas corresponding to the two quadrants symmetric about the central axis L among the four quadrants divided by the four elastic connection members 5A when viewed from the Z direction in the force receiving member 4. It should be noted that in the XY plane, the protrusion 11e and the protrusion 11g are provided at positions that are point-symmetric with respect to the central axis L, and the protrusion 11f and the protrusion 11h are provided at positions that are point-symmetric with respect to the central axis L.

Scales 8Ae to 8Ah, which are detection target objects, are disposed at the respective distal ends of the protrusions 11e to 11h so as to face the sensor substrate 7. The scales 8Aa to 8Ah are disposed so as to have substantially the same height in the Z direction. Further, the displacement detection elements 9Aa to 9Ah are mounted on the sensor substrate 7 so as to face the scales 8Aa to 8Ah.

The elastic connection member 5A has a function of transforming a displacement direction. That is, the substantially U-shaped bottom of the elastic connection member 5A is a displacement member that is displaced in the X direction or the Y direction (second direction) that intersects the support member 20 due to the displacement of the force receiving member 4 in the Z direction (first direction). Specifically, when the force receiving member 4 is pressed and the external force Fz in the −Z direction is input to the force receiving member 4, the elastic connection member 5A sinks with the boundary between the cylindrical member 6 and the elastic connection member 5A as a point of support, so that the substantially U-shaped part draws an arc with respect to the point of support, that is, is displaced in the +Y direction as well as in the −Z direction. Therefore, the scale 8Aa provided in the elastic connection member 5A is displaced in the +Y direction, the scale 8Ab is displaced in the +X direction, the scale 8Ac is displaced in the −Y direction, and the scale 8Ad is displaced in the −X direction. When the moment Mx is input to the force receiving member 4, the scales 8Aa and 8Ac are both displaced in the Y direction. At this time, whether the displacement is in the +Y direction or the −Y direction is determined by the orientation of the moment Mx. When the moment My is input to the force receiving member 4, the scales 8Ab and 8Ad are displaced in the X direction. At this time, whether the displacement is in the +X direction or the −X direction is determined by the orientation of the moment My. When the external force Fx is input to the force receiving member 4, the scales 8Ae to 8Ah are displaced in the same orientation in the X direction as the external force Fx. When the external force Fy is input to the force receiving member 4, the scales 8Ae to 8Ah are displaced in the same orientation in the Y direction as the external force Fy. When the moment Mz is input to the force receiving member 4, the scales 8Ae and 8Ag are substantially displaced in the X direction, and the scales 8Af and 8Ah are substantially displaced in the Y direction. Whether the displacement in the positive direction or the displacement in the negative direction in the X direction and the Y direction is determined by the orientation of the moment Mz.

Figure 5:
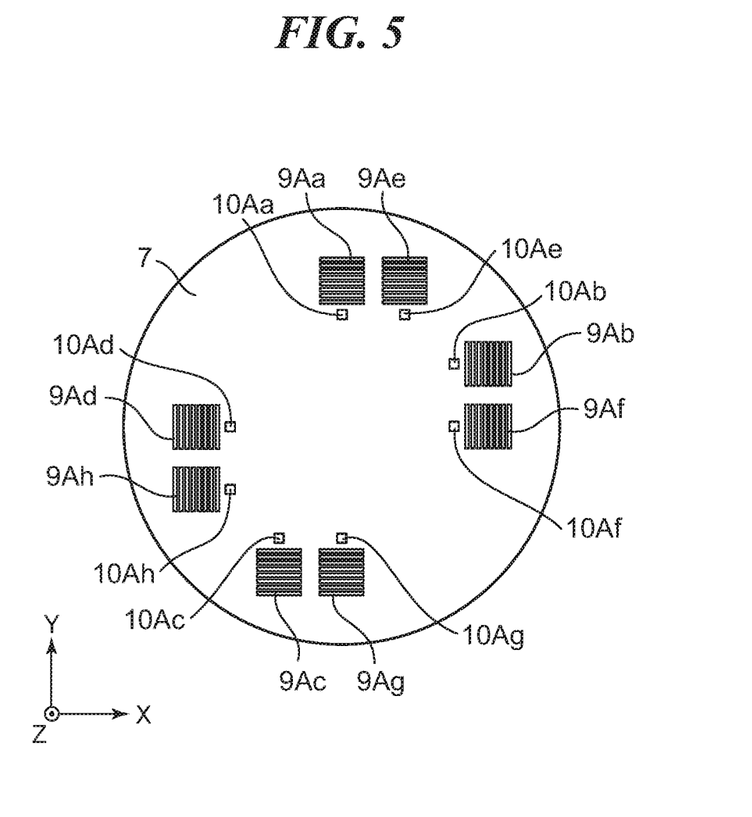
FIG. 5 is a plan view showing the structure of the upper surface of a sensor substrate composing the force sensor shown in FIGS. 4A to 4C.

FIG. 5 is a plan view showing the configuration of the upper surface of the sensor substrate 7. Light sources 10Aa to 10Ah are disposed so as to correspond to the displacement detection elements 9Aa to 9Ah, on the sensor substrate 7, respectively. Each of the light sources 10Aa to 10Ah is equivalent to the light source 10a described in the first embodiment. Each of the scales 8Aa to 8Ah is equivalent to the scale 8a described in the first embodiment. Each of the displacement detection elements 9Aa to 9Ah is equivalent to the displacement detection element 9a described in the first embodiment. Among the displacement detection elements 9Aa to 9Ah, the direction of the light receiving surface (direction of the stripe) of the adjacent displacement detection elements is the same.

As in the first embodiment, the scales 8Aa to 8Ah reflect the divergent light beams generated by the light sources 10Aa to 10Ah, a pattern of diffracted light as bright and dark fringes is formed on the displacement detection elements 9Aa to 9Ah. The arrangement pitch of the light receiving surfaces of the displacement detection elements 9Aa to 9Ah is made to coincide with a quarter cycle of the pattern of the diffracted light. Therefore, when the scales 8Aa to 8Ah are displaced in the arrangement direction of the light receiving surfaces of the displacement detection elements 9Aa to 9Ah, the pattern of the diffracted light moves accordingly. Thereby, two-phase sine wave shape signals (sin and cos) having a phase difference of 90 degrees are obtained from the light receiving surfaces of the displacement detection elements 9Aa to 9Ah. When the arctangent calculation (tan−1) of the obtained signal is performed, the amounts of displacement of the scales 8Aa to 8Ah in the above-described direction can be detected. From the amount of displacements thus detected, Fx, Fy, Fz, Mx, My, and Mz, which are the six components of the external force, can be obtained by calculation.

As described above, in the force sensor 100A, since the elastic connection member 5A has a displacement transformation function (displacement member), there is no need to separately provide a displacement transformation mechanism, moreover, the force sensor 100A has the same features as the force sensor 100 according to the first embodiment. Therefore, in the force sensor 100A, the size reduction and the cost reduction can be realized. It should be noted that in the present embodiment, a method for optically detecting the displacements of the scales 8Aa to 8Ad (detection target object) is used, but the method for detecting the displacement of the detection target object is not limited to this. A capacitance type or magnetostriction type detection unit may be used.

Third Embodiment

In the third embodiment of the present invention, a variation of the elastic connection member will be described. In the force sensor according to the third embodiment, the configuration of the portions except for the elastic connection member shall conform to the force sensors 100, 100A according to the first embodiment or the second embodiment, and the description here is omitted.

Figure 6A:
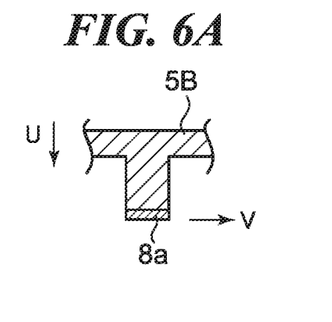
FIG. 6A is a cross-sectional view of an elastic connection member of a force sensor according to a third embodiment of the present invention.
Figure 6B:
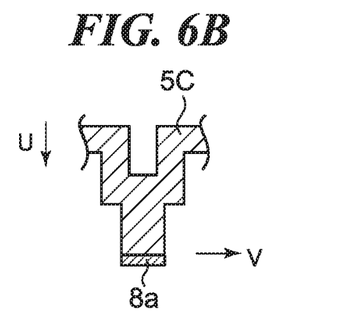
FIG. 6B is a cross-sectional view of an elastic connection member of a force sensor according to a third embodiment of the present invention.
Figure 6C:
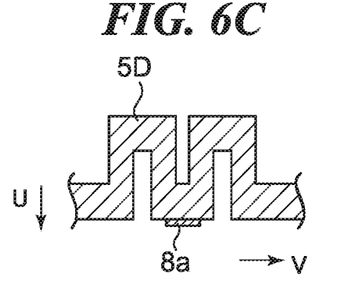
FIG. 6C is a cross-sectional view of an elastic connection member of a force sensor according to a third embodiment of the present invention.
Figure 6D:
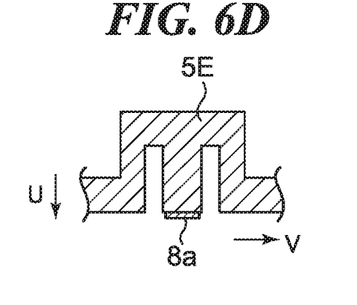
FIG. 6D is a cross-sectional view of an elastic connection member of a force sensor according to a third embodiment of the present invention.
Figure 6E:
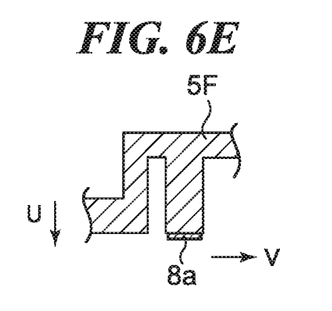
FIG. 6E is a cross-sectional view of an elastic connection member of a force sensor according to a third embodiment of the present invention.
Figure 6F:
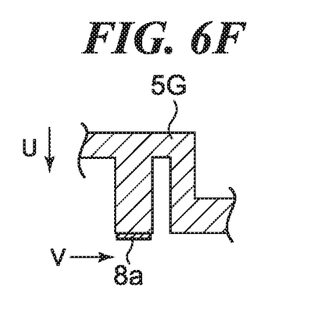
FIG. 6F is a cross-sectional view of an elastic connection member of a force sensor according to a third embodiment of the present invention.
Figure 6G:
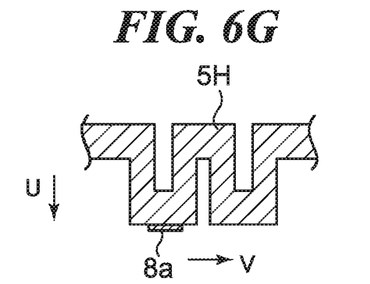
FIG. 6G is a cross-sectional view of an elastic connection member of a force sensor according to a third embodiment of the present invention.

FIG. 6A is a cross-sectional view of a first example (elastic connection member 5B) of the elastic connection member provided in the force sensor according to the third embodiment of the present invention. It should be noted that FIG. 6A is shown in the ZX cross section corresponding to FIG. 4A. The elastic connection member 5B has a protrusion protruding in the −Z direction, and a scale 8a (same as the scale 8a described in the first embodiment) is disposed at the distal end of the protrusion. For example, when an external force −Fz is input to the force receiving member (not shown), the end of the elastic connection member 5B on the force receiving member side (the left end in FIG. 6A) is displaced in the −Z direction by the amount of displacement U. Then, the scale 8a disposed at the distal end of the protrusion of the elastic connection member 5B is displaced by the amount of displacement V in the direction of the end opposite to the end on the force receiving member side. The external force −Fz can be calculated by detecting this displacement with a displacement detection element (not shown). When an external force in another direction is input, the external force can be calculated in the same manner as in the first embodiment and the second embodiment.

Generally, the elastic connection member according to the third embodiment has, as in the elastic connection member 5B, at least one protrusion portion protruding toward the displacement detection element in a direction (Z direction) orthogonal to the direction (X direction and Y direction) connecting the force receiving member 4 and the cylindrical member 6. A scale is disposed at the distal end surface of the protrusion portion. Such a protrusion portion may be formed by shifting the connection position between the elastic connection member and the force receiving member and the connection position between the elastic connection member and the cylindrical member in the Z direction, or it may be formed by providing a protrusion and a depression on the elastic connection member in the Z direction. Some examples of these are described below.

Figure 6H:
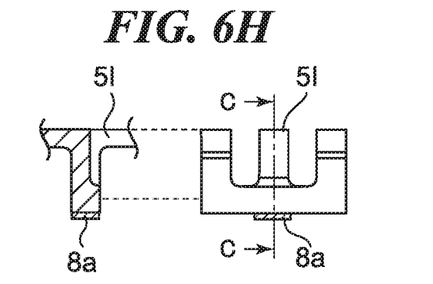
FIG. 6H is a cross-sectional view of an elastic connection member of a force sensor according to a third embodiment of the present invention.

Elastic connection members 5C to 5I of FIGS. 6B to 6H shown in cross-sectional views in a similar manner to FIG. 6A show the second to eighth examples of the force sensor according to the third embodiment. It should be noted that FIGS. 6B to 6G are shown in the ZX cross section corresponding to FIG. 4A. In FIG. 6H, the right-side diagram is a view as viewed from the X direction or the Y-direction, and the left-side diagram is a cross-sectional view taken along line C-C shown in the right-side diagram. As in the examples shown in the elastic connection members 5C to 5I, the elastic connection member may have any cross-sectional shape as long as the scale receives the amount of displacement in a predetermined direction by being deformed by the external force received by the force receiving member. Therefore, the shapes of the elastic connection members 5B to 5I shown in FIGS. 6A to 6H are merely examples, and the cross-sectional shapes of the elastic connection members are not limited to them.

Other Embodiments

Although the present invention has been described above on the basis of the preferred embodiments thereof, the present invention is not limited to these specific embodiments. Various embodiments within the scope not departing from the gist of the present invention are also included in the present invention. Furthermore, each of the above-described embodiments is merely an embodiment of the present invention, and the embodiments can be appropriately combined. For example, in the above embodiment, the overall shape of the force sensor is cylindrical (disk shape), but the embodiment is not limited to this. For example, instead of the cylindrical member 6, polygonal cylindrical member (hexagonal cylinder, octagonal cylinder, and the like) may be used, and the force receiving member 4 may also be a polygonal member. It should be noted that even in such a case, it is desirable that the structure be point-symmetric with respect to the central axis L. The present invention can be suitably used for an apparatus including a force sensor and a base including the force sensor, such as an arm of an industrial robot, and a manipulator for medical use and the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to reduce the size and cost of the force sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A force sensor comprising:
    a support member including a lower lid and a polygonal cylindrical member protruding from a peripheral of the lower lid;
    a force receiving member configured to be displaced in a first direction with respect to the support member by an action of an external force and including a central protruding portion protruding in the first direction;
    a plurality of elastic connection members disposed radially around the central protruding portion, the plurality of elastic connection members having outer ends connected to the polygonal cylindrical member of the support member and inner ends connected to the central protruding portion of the force receiving member;
    a plurality of detection target objects each disposed respectively on corresponding ones of the plurality of elastic connection members; and
    a plurality of displacement detection elements disposed on the support member so as to face the detection target objects in a one-to-one manner, and configured to detect movements of the detection target objects,
    wherein each said elastic connection member has a displacement member that is to be displaced, by a displacement of the force receiving member in the first direction, in a direction intersecting the first direction.

2. The force sensor according to claim 1, wherein
    each of said plurality of elastic connection members has at least one protrusion portion, and
    the detection target objects are disposed on a distal end surface of the protrusion portion.

3. The force sensor according to claim 1, wherein
    each of said plurality of elastic connection members is disposed radially about the force receiving member at equal intervals so as to be located on substantially a same plane, and
    each of said plurality of elastic connection members is provided with one of the detection target objects.

4. The force sensor according to claim 1, wherein each said displacement detection element optically detects a displacement of a corresponding one of the plurality of detection target objects.

5. The force sensor according to claim 1, wherein each said displacement detection element detects a displacement of a corresponding one of the plurality of detection target objects by detecting a change in a capacitance between such displacement detection element and such detection target object.

6. The force sensor according to claim 1, wherein each said displacement detection element detects a displacement of a corresponding one of the plurality of detection target objects by detecting a change in a magnetic field.

7. The force sensor according to claim 1, wherein
    the force receiving member includes a disk portion, and a cylinder portion protruding from a center of one plane of the disk portion,
    the support member includes a cylindrical member, and
    the cylinder portion is connected to the cylindrical member via the plurality of elastic connection members.

8. The force sensor according to claim 1, comprising a symmetrical structure about a central axis of the force receiving member, the central axis being parallel to a direction in which the plurality of detection target objects and the plurality of displacement detection elements face each other.

9. The force sensor according to claim 1, wherein
    the force receiving member includes a disk portion, and a cylinder portion protruding from a center of one plane of the disk portion,
    the support member includes a cylindrical member, and
    the cylinder portion is connected to the cylindrical member via the plurality of elastic connection members.

10. The force sensor according to claim 1, wherein
    the force sensor comprises a symmetrical structure about a central axis of the force receiving member, the central axis being parallel to a direction in which the plurality of detection target objects and the plurality of displacement detection elements face each other.

11. The force sensor according to claim 1,
    wherein the plurality of elastic connection members 1s disposed radially at equal angular intervals about the force receiving member so as to be located on substantially a same plane.

* * * * *